(12) United States Patent
Kim et al.

(10) Patent No.: US 12,400,595 B2
(45) Date of Patent: Aug. 26, 2025

(54) POWER SUPPLY AND DISPLAY DEVICE INCLUDING THE SAME

(71) Applicant: LG Display Co., Ltd., Seoul (KR)

(72) Inventors: Dong Ju Kim, Paju-si (KR); Soon Dong Cho, Paju-si (KR); Hoon Jang, Paju-si (KR); Jun O Hur, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/493,063

(22) Filed: Oct. 24, 2023

(65) Prior Publication Data

US 2024/0221653 A1  Jul. 4, 2024

(30) Foreign Application Priority Data

Dec. 28, 2022  (KR) .................. 10-2022-0186852

(51) Int. Cl.
*G09G 3/32* (2016.01)
*G09G 3/3233* (2016.01)
*H02M 3/158* (2006.01)

(52) U.S. Cl.
CPC .......... *G09G 3/3233* (2013.01); *H02M 3/158* (2013.01); *G09G 2300/0842* (2013.01); *G09G 2320/0223* (2013.01); *G09G 2330/021* (2013.01); *G09G 2330/028* (2013.01)

(58) Field of Classification Search
None
See application file for complete search history.

(56) References Cited

U.S. PATENT DOCUMENTS

| 9,123,286 | B2 | 9/2015 | Park |
| 9,905,189 | B2 | 2/2018 | Cho et al. |
| 2015/0379937 | A1* | 12/2015 | Kim ..................... G09G 3/3291 345/691 |

FOREIGN PATENT DOCUMENTS

| KR | 101965892 B1 | 4/2019 |
| KR | 20210000185 A | 1/2021 |
| KR | 20210004375 A | 1/2021 |
| KR | 102273498 B1 | 7/2021 |

* cited by examiner

*Primary Examiner* — Carl Adams
(74) *Attorney, Agent, or Firm* — Seed Intellectual Property Law Group LLP

(57) ABSTRACT

A power supply according to an embodiment and a display device including the same are disclosed. The power supply according to the embodiment includes a reference voltage generation circuit configured to adjust a voltage level of a reference voltage and output the reference voltage when an input voltage is smaller than or equal to a selected threshold value. The power supply includes a power voltage generation circuit configured to adjust and provide an output power according to a fluctuation amount of the input voltage based on the adjusted reference voltage. The output power is varied either by changing the output voltage or by changing the output current.

20 Claims, 17 Drawing Sheets

POWER SUPPLY AND DISPLAY DEVICE INCLUDING THE SAME

CROSS-REFERENCE TO RELATED APPLICATION

This application claims priority to and the benefit of Korean Patent Application No. 10-2022-0186852 filed on Dec. 28, 2022, the disclosure of which is incorporated herein by reference in entirety for all purpose as if fully set forth herein.

BACKGROUND

Technical Field

The present disclosure relates to apparatuses, and more particularly, to, for example, without limitation, a power supply and a display device including the same.

Description of the Related Art

Display devices includes a liquid crystal display (LCD) device, an electroluminescence display device, a field emission display (FED) device, a plasma display panel (PDP), and the like.

Electroluminescent display devices are divided into inorganic light emitting display devices and organic light emitting display devices according to a material of a light emitting layer. An active-matrix type organic light emitting display device reproduces an input image using a self-emissive element which emits light by itself, for example, an organic light emitting diode (hereinafter referred to as an "OLED"). An organic light emitting display device has advantages in that a response speed is fast and luminous efficiency, luminance, and a viewing angle are large.

Some of display devices, for example, a liquid crystal display device or an organic light emitting display device includes a display panel including a plurality of sub-pixels, a driver outputting a driving signal for driving the display panel, a power supply generating power to be supplied to the display panel or the driver, and the like. The driver includes a gate driver that supplies a scan signal or a gate signal to the display panel, and a data driver that supplies a data signal to the display panel.

In such a display device, when a driving signal such as a scan signal, an EM signal, and/or a data signal is supplied to a plurality of sub-pixels formed in the display panel, the selected sub-pixel transmits light or emits light directly to thereby display an image.

The description provided in the background section should not be assumed to be prior art merely because it is mentioned in or associated with the background section. The background section may include information that describes one or more aspects of the subject technology.

BRIEF SUMMARY

A power supply generates a high-potential driving voltage and/or a low-potential driving voltage and applies the high-potential driving voltage and/or the low-potential driving voltage to a display panel. However, when a load is large, since a voltage drop occurs at an input end of the power supply, a voltage margin defect occurs.

In order to improve this voltage margin defect, a method of dispersing currents by configuring a separate boost integrated circuit (IC) for a source drive IC has been applied, but since a separate configuration should be added to this method, the number of components increases, and accordingly, costs increase.

The present disclosure addresses the various technical problems in the related art including the above-described problems.

The present disclosure is to provide a power supply capable of varying a driving voltage and a display device including the same.

It should be noted that objects of the present disclosure are not limited to the above-described objects, and other objects of the present disclosure will be apparent to those skilled in the art from the following descriptions.

A power supply according to an embodiment of the present disclosure includes: a reference voltage generation circuit configured to adjust a voltage level of a reference voltage and output the reference voltage when an input voltage is smaller than or equal to a selected threshold value; and a power voltage generation circuit configured to adjust and provide output power according to a fluctuation amount of the input voltage based on the adjusted reference voltage. In some embodiments, the output power is varied by changing the output voltage. In some embodiments, the output power is varied by changing the output current.

A display device according to an embodiment of the present disclosure includes: a display panel on which a plurality of sub-pixels are disposed; a display panel driving circuit configured to write pixel data to the sub-pixels of the display panel; and a power supply configured to supply power to the display panel and the display panel driving circuit, wherein the power supply includes a power voltage generation circuit, and the power voltage generation circuit includes: a reference voltage generation circuit configured to adjust a voltage level of a reference voltage and output the reference voltage when an input voltage is smaller than or equal to a selected threshold value; and a power voltage generation circuit configured to adjust and provide an output power according to a fluctuation amount of the input voltage based on the adjusted reference voltage.

According to the present disclosure, when a specific pattern which causes a voltage drop in an input voltage is generated, a voltage margin defect can be improved by varying an output voltage or output current in proportion to a fluctuation amount according to a fluctuation of the input voltage, and outputting the output voltage or output current.

According to the present disclosure, since the output voltage or output current is varied according to a fluctuation of the input voltage without adding additional components, the number of components can be reduced, and accordingly, costs can be reduced and a space in a circuit board can be secured.

The effects of the present disclosure are not limited to the above-mentioned effects, and other effects that are not mentioned will be apparently understood by those skilled in the art from the following description and the appended claims.

It is to be understood that both the foregoing general description and the following detailed description are exemplary and explanatory and are intended to provide further explanation of the inventive concepts as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain the principle of the disclosure. The above and other objects, features and advantages of the present disclosure will become more apparent to those of ordinary skill in the art by describing exemplary embodiments thereof in detail with reference to the accompanying drawings, in which.

Figure 1:
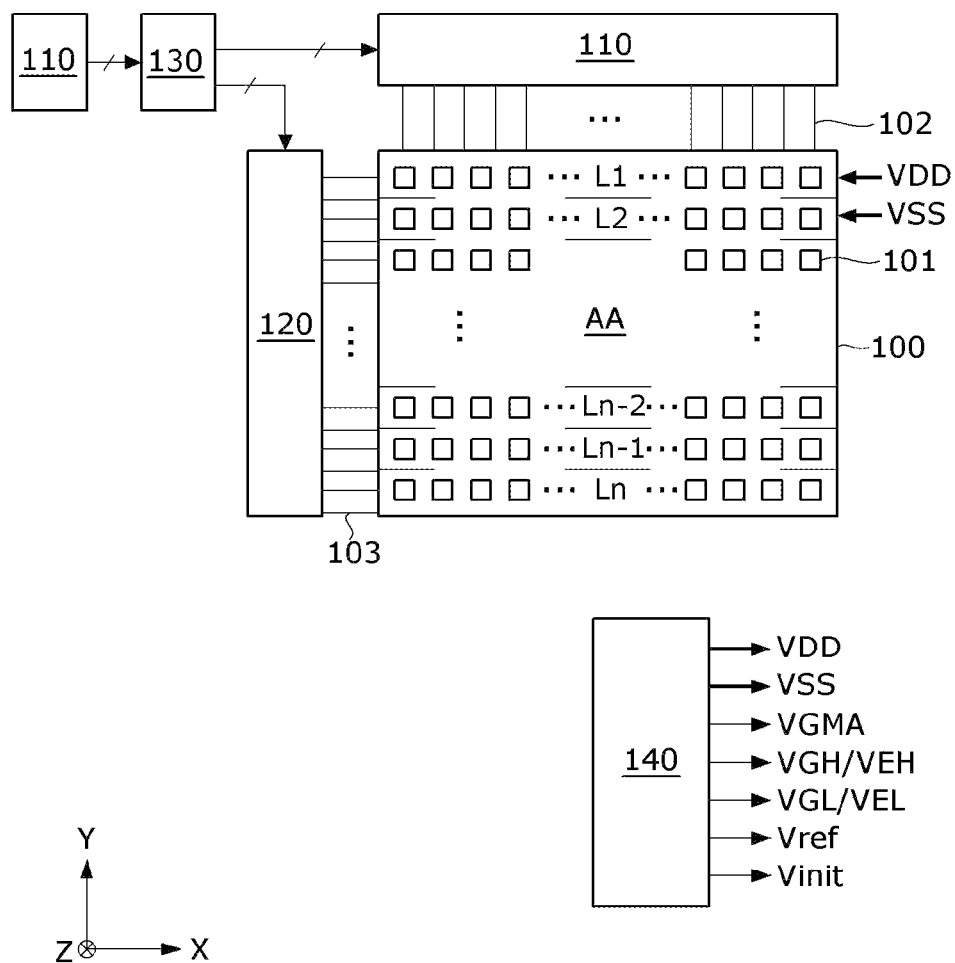
FIG. 1 is a block diagram of a display device according to an exemplary embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Names of the respective elements used in the following explanations may be selected only for convenience of writing the specification and may be thus different from those used in actual products.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims. Any implementation described herein as an "example" is not necessarily to be construed as preferred or advantageous over other implementations.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

When the position relation between two components is described using the terms such as "on," "above," "below," and "next." one or more components may be positioned between the two components unless the terms are used with the term "immediately" or "directly."

The terms, such as "below," "lower." "above." "upper" and the like, may be used herein to describe a relationship between element item(s) as illustrated in the drawings. It will be understood that the terms are spatially relative and based on the orientation depicted in the drawings.

The terms "first." "second," "A," "B." "(a)," and "(b)," and the like may be used to distinguish components from each other, but the functions or structures of the components are not limited by ordinal numbers or component names in front of the components.

The same reference numerals may refer to substantially the same elements throughout the present disclosure.

The term "at least one" should be understood as including any and all combinations of one or more of the associated listed items. For example, the meaning of "at least one of a first element, a second element, and a third element" compasses the combination of all three listed elements, combinations of any two of the three elements, as well as each individual element, the first element, the second element, or the third element.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

Where an element or layer is referred to as being "on" or "connected to" another element or layer, it should be understood to mean that the element or layer may be directly on or directly connected to the other element or layer, or that intervening elements or layers may be present. Also, where one element is referred to as being disposed "on" or "under" another element, it should be understood to mean that the elements may be so disposed to directly contact each other, or may be so disposed without directly contacting each other.

The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings. For convenience of description, a scale of each of elements illustrated in the accompanying drawings differs from a real scale, and thus, is not limited to a scale illustrated in the drawings.

Figure 2:
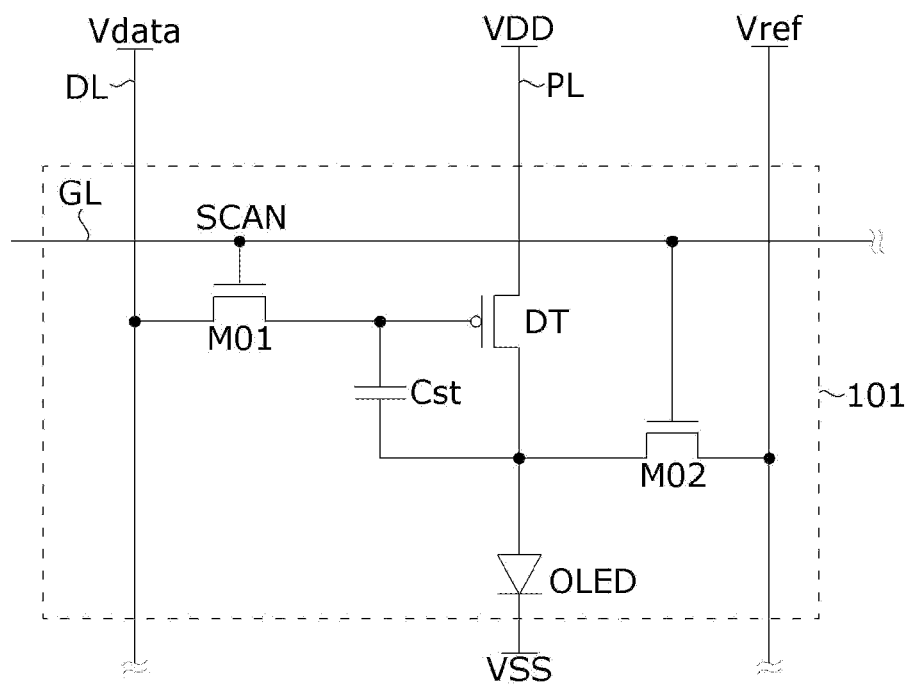
FIG. 2 is a view schematically illustrating pixels shown in FIG. 1 according to an exemplary embodiment of the present disclosure.

FIG. 1 is a block diagram illustrating a display device according to an exemplary embodiment of the present disclosure, and FIG. 2 is a view schematically illustrating pixels shown in FIG. 1 according to an exemplary embodiment of the present disclosure.

Referring to FIG. 1, the display device according to an exemplary embodiment of the present disclosure includes a display panel 100, a display panel driver for writing pixel data to pixels of the display panel 100, and a power supply 140 for generating power for driving the pixels and the display panel driver.

The display panel 100 includes a pixel array AA that displays an input image. The pixel array AA includes a plurality of data lines 102, a plurality of gate lines 103 intersected with the data lines 102, and pixels 101. The pixels 101 may be arranged in a matrix form, for example, but are not necessarily limited to. As an example, each of the pixels 101 may be disposed in the region where gate lines and data lines intersect with each other, without being limited thereto.

The pixel array AA includes a plurality of pixel lines L1 to Ln. Each of the pixel lines L1 to Ln includes one line of pixels arranged along a line direction X in the pixel array AA of the display panel 100. Pixels arranged in one pixel line share the gate lines 103. As an example, at least some of the pixels arranged in one pixel line share the same gate line 103. Pixels arranged in a column direction Y along a data line direction share the same data line 102. As an example, at least some of the pixels arranged in a column direction Y along a data line direction share the same data line 102. One horizontal period 1H is a time obtained by dividing one frame period by the total number of pixel lines L1 to Ln, without being limited thereto.

Touch sensors may be optionally disposed on the display panel 100. A touch input may be sensed using separate touch sensors or may be sensed through pixels. The touch sensors may be disposed as an on-cell type or an add-on type on the screen of the display panel or implemented as in-cell type touch sensors embedded in the pixel array AA.

The display panel 100 may be implemented as a rigid display panel or a flexible display panel. As an example, the flexible display panel may be made of a plastic OLED panel. As an example, an organic thin film may be disposed, for example, on a back plate of the plastic OLED panel, and the pixel array AA may be formed on the organic thin film.

As an example, the back plate of the plastic OLED may be a polyethylene terephthalate (PET) substrate, but embodiments of the present disclosure are not limited thereto. The organic thin film is formed on the back plate. The pixel array AA and an optional touch sensor array may be formed on the organic thin film. The back plate reduces or blocks moisture permeation so that the pixel array AA is not exposed to humidity. The organic thin film may be a thin Polyimide (PI) film substrate, without being limited thereto. A multi-layered buffer film may be optionally formed of an insulating material (not shown) on the organic thin film. Lines may be formed on the organic thin film so as to supply power or signals applied to the pixel array AA and/or the touch sensor array.

To implement color, each of the pixels may be divided into a red pixel (hereinafter referred to as "R pixel"), a green pixel (hereinafter referred to as "G pixel"), and a blue pixel (hereinafter referred to as "B pixel"), without being limited thereto. Each of the pixels may further include a white pixel. Pixels of other colors such as cyan, magenta, or yellow, etc., are also possible. Each of the pixels 101 includes a pixel circuit. Hereinafter, a pixel may be interpreted as having the same meaning as a sub-pixel. The pixel circuit is connected to the data line 102 and the gate line 103.

The pixels may be arranged as real color pixels and pentile pixels. The pentile pixel may realize a higher resolution than the real color pixel by driving two sub-pixels having different colors as one pixel 101 through a preset pixel rendering algorithm. The pixel rendering algorithm may compensate for insufficient color representation in each pixel with the color of light emitted from an adjacent pixel.

Referring to FIG. 2, when a high-potential power voltage VDD and a low-potential power voltage VSS are applied to pixels formed in a display panel 100 from a power supply together with driving signals, as the pixels emit light, an image may be displayed.

For example, a pixel 101 may include a pixel circuit including a driving element DT, switching elements M01 and M02, a storage capacitor Cst, an organic light-emitting diode OLED, and the like, without being limited thereto. As an example, the pixel circuit may include more or less switching elements, more storage capacitors and/or more OLEDs.

The power supply 140 generates DC power required for driving the pixel array AA and the display panel driving circuit of the display panel 100, for example, by using a DC-DC converter. The DC-DC converter may include a charge pump, a regulator, a buck converter, a boost converter, and the like, without being limited thereto. The power supply 140 may adjust a DC voltage input, for example, from a host system (not shown) and thereby generate DC voltages such as a gamma reference voltage VGMA, gate-on voltages VGH and/or VEH, gate-off voltages VGL and/or VEL, a first driving voltage VDD, and a second driving voltage VSS, an initial voltage Vini, and a reference voltage Vref, without being limited thereto. As an example, at least one of these voltages may be omitted or generated by other components depending on the design, or additional voltages may be generated. The gamma reference voltage VGMA is supplied to a data driver 110. The gate-on voltages VGH and/or VEH and the gate-off voltages VGL and/or VEL are supplied to a gate driver 120. The first driving voltage VDD and the second driving voltage VSS, the initial voltage Vini and/or the reference voltage Vref are supplied to the pixel circuits via a set of signal wires.

The display panel driving circuit applies analog voltages corresponding to pixel data of an input image to the pixels of the display panel 100 under the control of a timing controller (TCON) 130.

The display panel driving circuit includes the data driver 110 and the gate driver 120.

The display panel driving circuit may optionally further include a de-multiplexer (DEMUX) disposed between the data driver 110 and the data lines 102. The de-multiplexer is omitted from FIG. 1. The de-multiplexer (e.g., sequentially) connects one channel of the data driver 110 to the plurality of data lines 102 and distributes in a time division manner the data voltage outputted from one channel of the data driver 110 to the data lines 102 by using a plurality of de-multiplexers (DEMUX) to transfer the data voltage output from the data driver 110 to the data lines 102, thereby reducing the number of channels of the data driver 110. The de-multiplexer array may include a plurality of switch elements disposed on the display panel 100. When the de-multiplexer array is disposed between output terminals of the data driver 110 and the data lines 102, the number of channels of the data driver 110 may be reduced. The de-multiplexer array may be omitted. In this case, output buffers of the data driver 110 are directly connected to the data lines 102.

The display panel driving circuit may optionally further include a touch sensor driver for driving the touch sensors. The touch sensor driver is omitted from FIG. 1. As an example, at least some of the timing controller 130, the power supply 140, the data driver 110, and the like may be integrated into one drive integrated circuit (IC). As an example, in a mobile device, at least some of the timing controller 130, the power supply 140, the data driver 110, and the like may be integrated into one drive integrated circuit (IC).

The data driver 110 generates a data voltage Vdata by converting pixel data of an input image received, for example, from the timing controller 130 with a gamma compensation voltage every frame period by using a digital to analog converter (DAC). The gamma reference voltage VGMA is divided for respective gray scales through a voltage divider circuit. The gamma compensation voltage divided from the gamma reference voltage VGMA is provided to the DAC of the data driver 110. The data voltage Vdata is outputted through the output buffer in each of the channels of the data driver 110.

The gate driver 120 may be implemented as a gate in panel (GIP) circuit formed directly on a bezel BZ area of the display panel 100 together with the TFT array of the pixel array AA, without being limited thereto. The GIP circuit may be disposed in a bezel (BZ) area, which is a non-display area, of the display panel 100 or may be dispersely disposed in the pixel array in which an input image is reproduced. As an example, the gate driver 120 may also be connected to the display panel 110 by a chip on film (COF) method, a tape automated bonding (TAB) method or a chip-on-glass (COG) method, etc. The gate driver 120 sequentially outputs gate signals to the gate lines 103 under the control of the timing controller 130. The gate driver 120 may sequentially supply the gate signals to the gate lines 103 by shifting the gate signals for example, by using a shift register. The gate signal may include a scan signal and a light emission control signal (hereinafter, referred to as an "EM signal") in the organic light emitting diode display. The scan signal includes a scan pulse swinging between the gate-on voltage VGH and the gate-off voltage VGL. The EM signal may include an EM pulse swinging between the gate-on voltage VEH and the gate-off voltage VEL.

The scan pulse is synchronized with the data voltage to select pixels of a line to which data is to be written. The EM signal defines the emission time of the pixels.

The timing controller 130 receives, from a host system (not shown), digital video data DATA of an input image and a timing signal synchronized therewith. The timing signal includes a vertical synchronization signal Vsync, a horizontal synchronization signal Hsync, a main clock CLK, a data enable signal DE, and the like. Because a vertical period and a horizontal period can be known by counting the data enable signal DE, the vertical synchronization signal Vsync and the horizontal synchronization signal Hsync may be omitted. The data enable signal DE has a cycle of one horizontal period (1H).

The host system may be any one of a television (TV) system, a set-top box, a navigation system, a personal computer (PC), a home theater system, a vehicle system, and a mobile device system, etc. The host system may scale an image signal from a video source to fit the resolution of the display panel 100 and transmit it to the timing controller 130 together with the timing signal.

A timing controller 130 lowers a frame rate (or frequency) at which pixel data is written to pixels in the low-speed driving mode compared to the normal driving mode. For example, a data refresh frame in which pixel data is written to pixels in the normal driving mode may occur at a frequency of 60 Hz or higher, for example, at any one refresh rate of 60 Hz, 120 Hz, and 144 Hz, and the data refresh frame (DRF) in the low-speed driving mode may occur at a refresh rate of a lower frequency than that of the normal driving mode. In order to lower the refresh rate of pixels in the low-speed driving mode, the timing controller 130 may lower the frame frequency to a frequency between 1 Hz and 30 Hz and thereby lower the driving frequency of the display panel driver.

The timing controller 130 multiplies an input frame frequency by i and controls the operation timing of the display panel driving circuit with a frame frequency of the input frame frequency×i (i is a positive integer greater than 0) Hz. The input frame frequency is 60 Hz in the NTSC (National Television Standards Committee) scheme and 50 Hz in the PAL (Phase-Alternating Line) scheme, without being limited there to. As an example, the input frame frequency may be a frequency other than 60 Hz and 50 Hz.

Based on the timing signals Vsync, Hsync, and DE received from the host system, the timing controller 130 generates a data timing control signal for controlling the operation timing of the data driver 110, MUX signals MUX1 and MUX2 for controlling the operation timing of the de-multiplexer array, and a gate timing control signal for controlling the operation timing of the gate driver 120. Controlling the operation timing of the display panel driver, the timing controller 130 synchronizes the data driver 110, the de-multiplexer array, the touch sensor driver, and the gate driver 120.

The voltage level of the gate timing control signal outputted from the timing controller 130 may be converted into the gate-on voltages VGH and/or VEH and the gate-off voltages VGL and/or VEL through a level shifter (not shown) and then supplied to the gate driver 120. As an example, the level shifter converts a low level voltage of the gate timing control signal into the gate-off voltages VGL and/or VEL and converts a high level voltage of the gate timing control signal into the gate-on voltages VGH and/or VEH, without being limited thereto. As another example, depending a type of the corresponding transistor, a low level voltage of the gate timing control signal may be converted into gate-on voltages VGH and/or VEH and/or a high level voltage of the gate timing control signal may be converted into the gate-off voltages VGL and/or VEL. The gate timing control signal includes the start pulse and the shift clock.

The timing controller 130 may control the power supply 140 to vary the output voltage of the power supply 140 according to the accumulated driving time of the pixels 101. For example, based on the result of measuring a reliability characteristic of positive bias temperature stress (PBTS) for transistors constituting the pixel circuit before product shipment, the shift amount of the threshold voltage Vth according to the accumulated driving time of the pixels may be derived. The timing controller 130 may have a look-up table (LUT) in which the shift amount of the threshold voltage according to the accumulated driving time of the switch element and corresponding voltage compensation values are preset. The timing controller 130 may provide a voltage compensation value for compensating for the shift amount of the threshold voltage according to the accumulated driving time of the pixels to the power supply 140, based on data stored in the look-up table. In this case, the power supply 140 may change at least one of the gamma reference voltage VGMA, the gate-on voltages VGH and VEH, and the gate-off voltages VGL and VEL according to the voltage compensation value from the timing controller 130. The data voltage Vdata outputted from the data driver 110 may be changed according to the gamma reference voltage VGMA. The voltages of the scan pulse and the EM pulse outputted from the gate driver 120 may be changed according to the gate-on voltages VGH and VEH and the gate-off voltages VGL and VEL.

Figure 3:
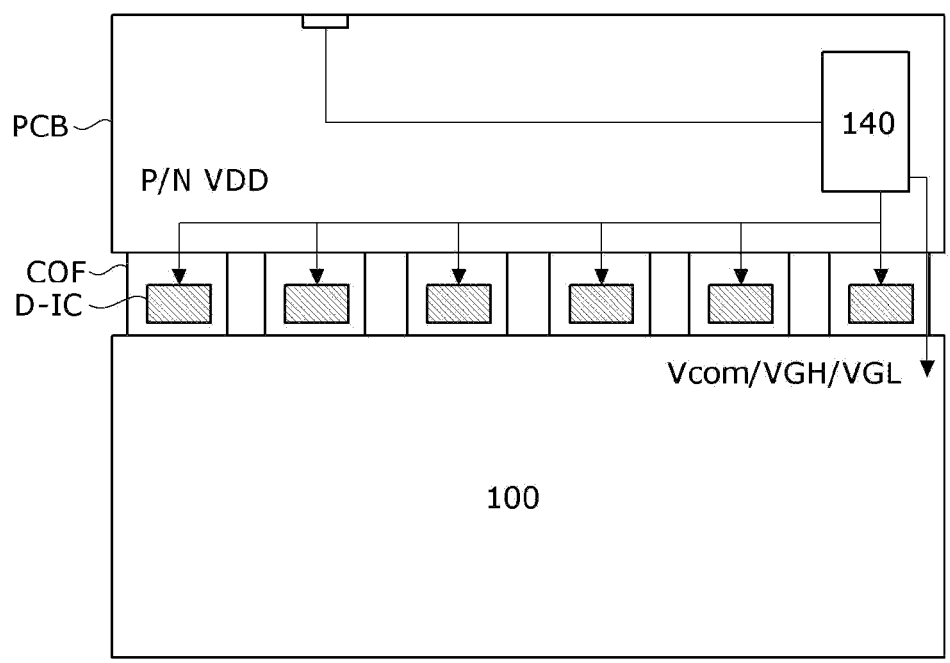
FIG. 3 is a view for describing an operation of a power supply according to the exemplary embodiment of the present disclosure.
Figure 4:
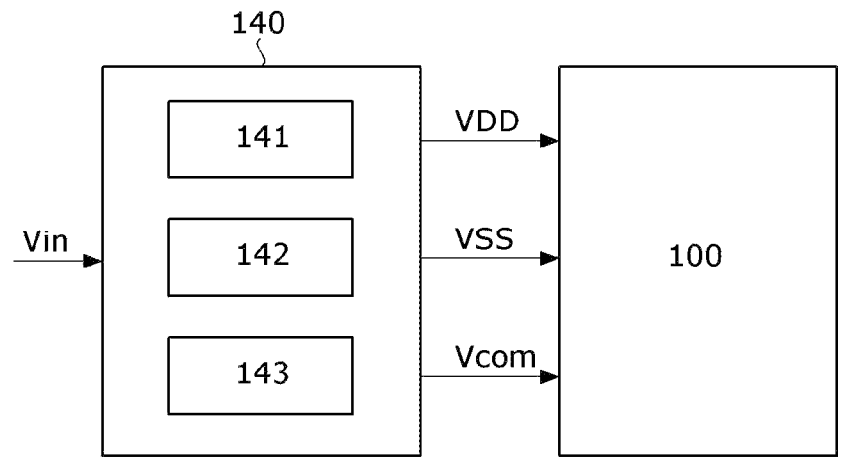
FIG. 4 is a block diagram of a configuration of the power supply shown in FIG. 3 according to an exemplary embodiment of the present disclosure.

FIG. 3 is a view for describing an operation of a power supply according to the exemplary embodiment of the present disclosure, and FIG. 4 is a block diagram of a configuration of the power supply shown in FIG. 3 according to an exemplary embodiment of the present disclosure.

Referring to FIG. 3, a chip on film (COF) may be attached to a display panel 100 as an anisotropic conductive film (ACF). The COF may include a drive integrated circuit (IC) D-IC, and connect a printed circuit board (PCB) PCB to the display panel 100.

A power supply 140 may be mounted on the PCB. The power supply 140 may generate a high-potential power voltage VDD or PVDD, a low-potential power voltage VSS or NVDD, and a common voltage Vcom, and supply the high-potential power voltage VDD or PVDD, the low-potential power voltage VSS or NVDD, and the common voltage Vcom to the display panel 100.

In the exemplary embodiment, when a specific pattern, which causes a voltage drop in an input voltage, is generated, an output voltage, for example, the high-potential power voltage PVDD or the low-potential power voltage NVDD, or an output current is varied in proportion to a fluctuation amount according to a fluctuation of the input voltage, and output. Here, the specific pattern refers to a pattern in which an output of a source drive-IC swings with a specific magnitude in one horizontal period (1H), and current consumption increases according to an output fluctuation of the source drive-IC.

For example, the specific pattern may be a pattern which fully swings to have a gradation of 255→0→255→0. This specific pattern may be changed according to an design of the display panel.

Referring to FIG. 4, the power supply 140 may include a first power voltage generation circuit 141 which generates the high-potential power voltage VDD, a second power voltage generation circuit 142 which generates the low-potential power voltage VSS, and a third power voltage generation circuit or a common voltage generation circuit 143 which generates the common voltage Vcom.

The first power voltage generation circuit 141 may generate the high-potential power voltage VDD by increasing a voltage level of an input voltage Vin. The first power voltage generation circuit 141 may be implemented as a boost converter.

The second power voltage generation circuit 142 may generate the low-potential power voltage VSS by lowering the voltage level of the input voltage Vin. The second power voltage generation circuit 142 may be implemented as a buck-boost converter.

The common voltage generation circuit 143 may generate the common voltage Vcom based on the input voltage Vin.

Figure 5:
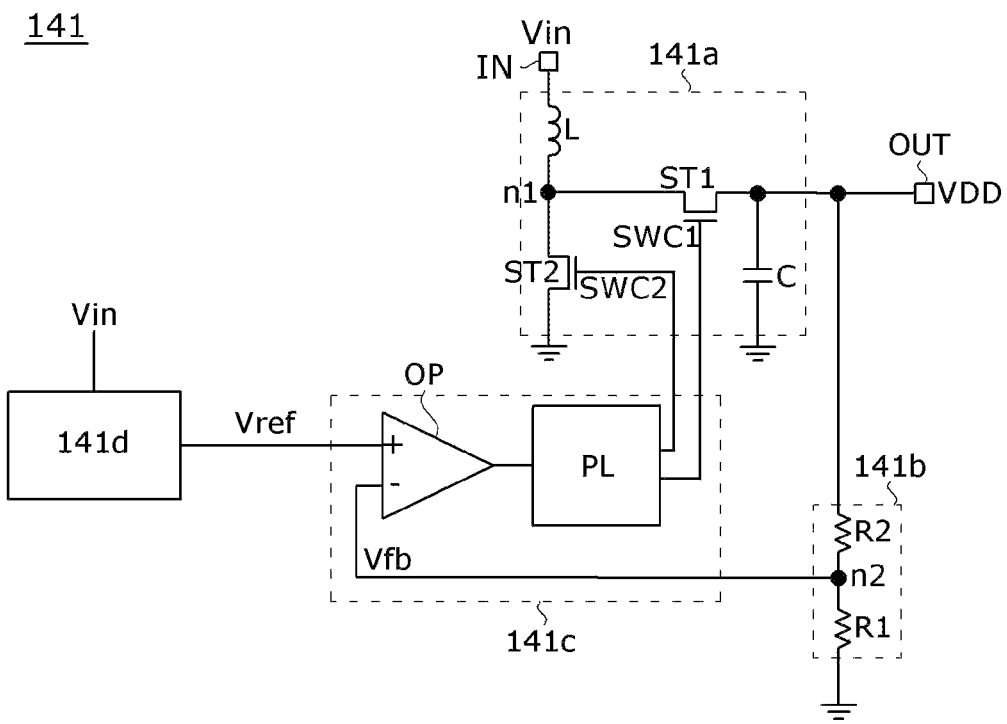
FIG. 5 is a view illustrating a configuration of a first power voltage generation circuit shown in FIG. 4 according to an exemplary embodiment of the present disclosure.
Figure 6A:
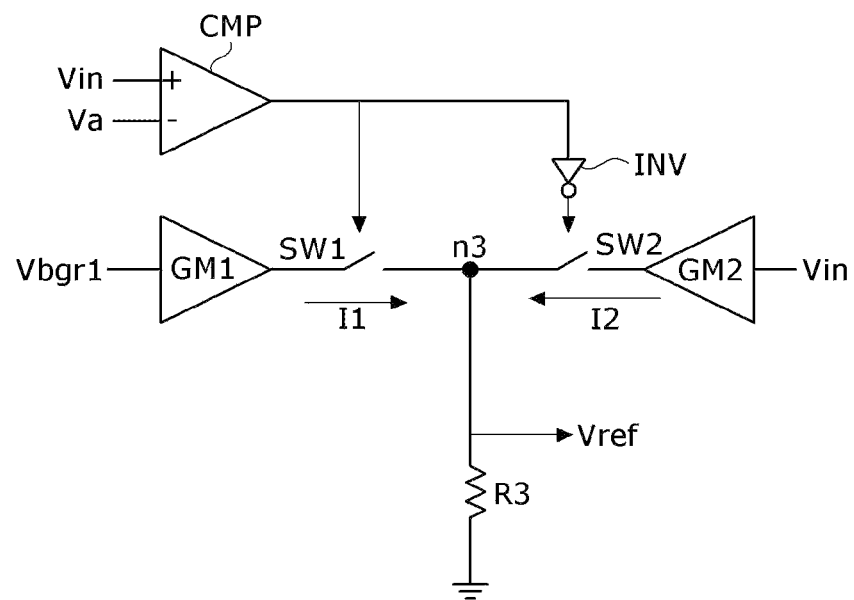
FIGS. 6A and 6B are views illustrating a configuration of a reference voltage generation circuit shown in FIG. 5 according to an exemplary embodiment of the present disclosure.
Figure 6B:
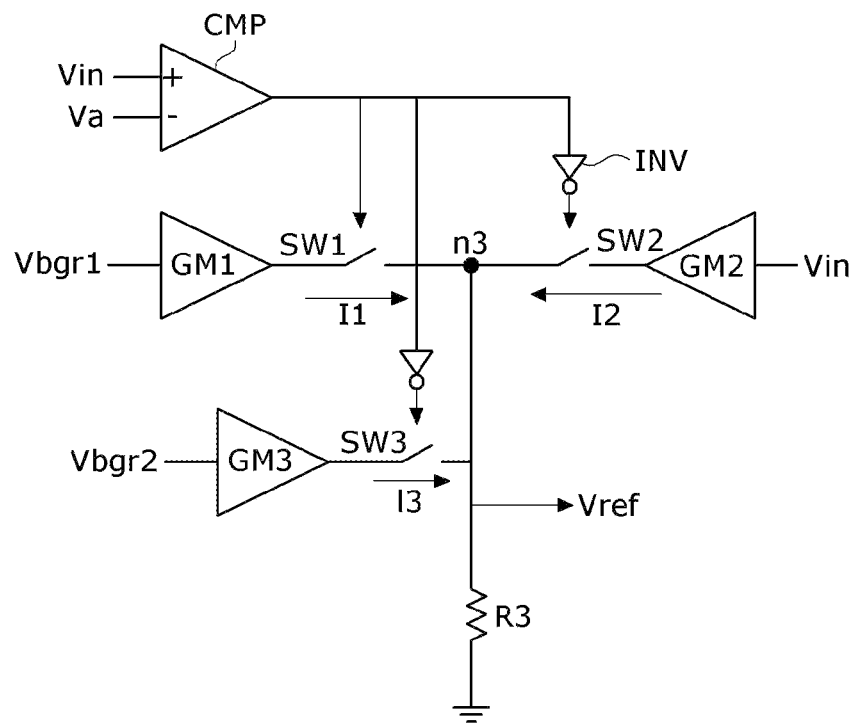

FIG. 5 is a view illustrating a configuration of a first power voltage generation circuit shown in FIG. 4 according to an exemplary embodiment of the present disclosure, FIGS. 6A and 6B are views illustrating a configuration of a reference voltage generation circuit shown in FIG. 5 according to an exemplary embodiment of the present disclosure, and FIGS. 7A to 7D are views for describing the principle of varying a reference voltage according to a fluctuation of an input voltage according to an exemplary embodiment of the present disclosure.

Referring to FIG. 5, the first power voltage generation circuit 141 according to the exemplary embodiment of the present disclosure includes a boost converter 141a, a voltage sensing circuit 141b, a power voltage variable circuit 141c, and a reference voltage generation circuit 141d.

The boost converter 141a may be connected between an input end IN and an output end OUT, convert the input voltage Vin input from the outside through the input end IN to generate the high-potential power voltage VDD, and output the high-potential power voltage VDD to the display panel 100 through the output end OUT.

The boost converter 141a may include an inductor L, a first switch element ST1, a second switch element ST2, and a capacitor C.

The inductor L may be connected between the input end IN and a first node n1.

The first switch element ST1 is connected between the first node n1 and the output end OUT, and is driven, that is, is turned on or turned off so that an input current by the input voltage Vin is transmitted to the inductor L or blocked. The first switch element ST1 includes a gate electrode to which a first control signal SWC1 is applied, a first electrode connected to the first node n1, and a second electrode connected to the output end OUT.

The second switch element ST2 is connected between the first node n1 and the ground, and is driven, that is, is turned on or turned off so that the input current by the input voltage Vin is transmitted to the inductor L or blocked. The second switch element ST2 includes a gate electrode to which a second control signal SWC2 is applied, a first electrode connected to the first node n1, and a second electrode connected to the ground.

In this case, the first switch element ST1 and the second switch element ST2 may be alternately driven.

The capacitor C may be connected between the output end OUT and the ground.

The voltage sensing circuit 141b may be connected to the output end OUT, from which the high-potential power voltage VDD is output, to divide the high-potential power voltage VDD which is the output voltage and transmit the divided voltage. For example, the voltage sensing circuit 141b may include a first resistor R1 and a second resistor R2.

The first resistor R1 and the second resistor R2 may be connected in series between the output end OUT and the ground. In the first resistor R1, one end is connected to the second node n2 and the other end is connected to the ground. In the second resistor R2, one end is connected to the output end OUT and the other end is connected to the second node n2.

The power voltage variable circuit 141c may vary the high-potential power voltage VDD according to the fluctuation of the input voltage. The power voltage variable circuit 141c may include an operational amplifier OP and a pulse width modulation (PWM) logic PL.

The operational amplifier OP may include a first input end (+) to which a reference voltage Vref is input, a second input end (−) connected to the second node n2 and to which the divided voltage is input, and the output end OUT which outputs a control voltage. Here, the first input end (+) may be a non-inverting input end, and the second input end (−) may be an inverting input end.

The PWM logic PL may generate the first control signal SWC1 and the second control signal SWC2 according to the input control voltage, apply the first control signal SWC1 to the first switch element ST1, and apply the second control signal SWC2 to the second switch element ST2.

The reference voltage generation circuit 141d may output a reference voltage of which a voltage level is adjusted by adjusting the voltage level of the reference voltage Vref according to the fluctuation of the input voltage Vin.

Referring to FIG. 6A, the reference voltage generation circuit 141d according to one exemplary embodiment may include a comparator CMP (or also referred to as a comparator circuit CMP), a first amplifier GM1, a second amplifier GM2, a first switch SW1, a second switch SW2, and a third resistor R3.

The comparator circuit CMP may compare the input voltage Vin and a selected (or in some embodiments, pre-determined) threshold value Va and output a comparison value. Here, the threshold value Va may be changed. For example, the comparator circuit CMP may output a comparison value '1' when the input voltage Vin is greater than the threshold value Va, and output a comparison value '0' when the input voltage Vin is smaller than the threshold value Va, without being limited thereto. As an example, the comparator circuit CMP may output a comparison value '0' when the input voltage Vin is greater than the threshold value Va, and output a comparison value '1' when the input voltage Vin is smaller than the threshold value Va.

The first amplifier GM1 may amplify and output a first band gap reference voltage Vbgr1.

The first switch SW1 may be connected between the first amplifier GM1 and a third node n3, and may be turned on or turned off by the comparison value output from the comparator circuit CMP.

The second amplifier GM2 may amplify and output the input voltage Vin.

The second switch SW2 may be connected between the second amplifier GM2 and the third node n3, and may be turned on or turned off by an inverted value of the comparison value output from the comparator circuit CMP.

In this case, when the input voltage Vin is greater than a threshold value Vn, the first switch SW1 is turned on by the comparison value '1,' and the second switch SW2 is turned off by '0' which is a value inverted from the comparison value through an inverter INV. Accordingly, the reference voltage Vref output from the reference voltage generation circuit 141d may be determined as I1*R3 by a current I1 flowing through the third resistor R3.

On the other hand, when the input voltage Vin is smaller than the threshold value Vn, the first switch SW1 is turned off by the comparison value '0,' and the second switch SW2 is turned on by '1' which is a value inverted from the comparison value through the inverter INV. Accordingly, the reference voltage Vref output from the reference voltage generation circuit 141d may be determined as I2*R3 by a current I2 flowing through the third resistor R3. I2 is smaller than I1, and the reference voltage Vref output from the reference voltage generation circuit 141d may decrease as much as a difference between these currents.

Referring to FIG. 6B, a reference voltage generation circuit 141d according to another embodiment may include a comparator circuit CMP, a first amplifier GM1, a second amplifier GM2, a third amplifier GM3, a first switch SW1, a second switch SW2, a third switch SW3, and a third resistor R3.

The comparator circuit CMP may compare an input voltage Vin and a selected (or in some embodiments, pre-determined) threshold value Va and output a comparison value.

The first amplifier GM1 may amplify and output a first band gap reference voltage Vbgr1.

The first switch SW1 may be connected between the first amplifier GM1 and a third node n3, and may be turned on or turned off by the comparison value output from the comparator circuit CMP.

The second amplifier GM2 may amplify and output the input voltage Vin.

The second switch SW2 may be connected between the second amplifier GM2 and the third node n3, and may be turned on or turned off by an inverted value of the comparison value output from the comparator circuit CMP.

The third amplifier GM3 may amplify and output a second band gap reference voltage Vbgr2.

The third switch SW3 may be connected between the third amplifier GM3 and the third node n3, and may be turned on or turned off by the inverted value of the comparison value output from the comparator circuit CMP.

In this case, when the input voltage Vin is greater than a threshold value Vn, the first switch SW1 is turned on by a comparison value '1,' and the second switch SW2 and the third switch SW3 are turned off by '0' which is a value inverted from the comparison value. Accordingly, the reference voltage Vref output from the reference voltage generation circuit 141d may be determined as I1*R3 by a current I1 flowing through the third resistor R3.

On the other hand, when the input voltage Vin is smaller than the threshold value Vn, the first switch SW1 is turned off by the comparison value '0,' and the second switch SW2 and the third switch SW3 are turned on by '1' which is a value inverted from the comparison value. Accordingly, the reference voltage Vref output from the reference voltage generation circuit 141d may be determined as (I2+I3)*R3 by a current I2+I3 flowing through the third resistor R3. I2+I3 is smaller than I1, and the reference voltage Vref output from the reference voltage generation circuit 141d may decrease as much as a difference between these currents.

Figure 7A:
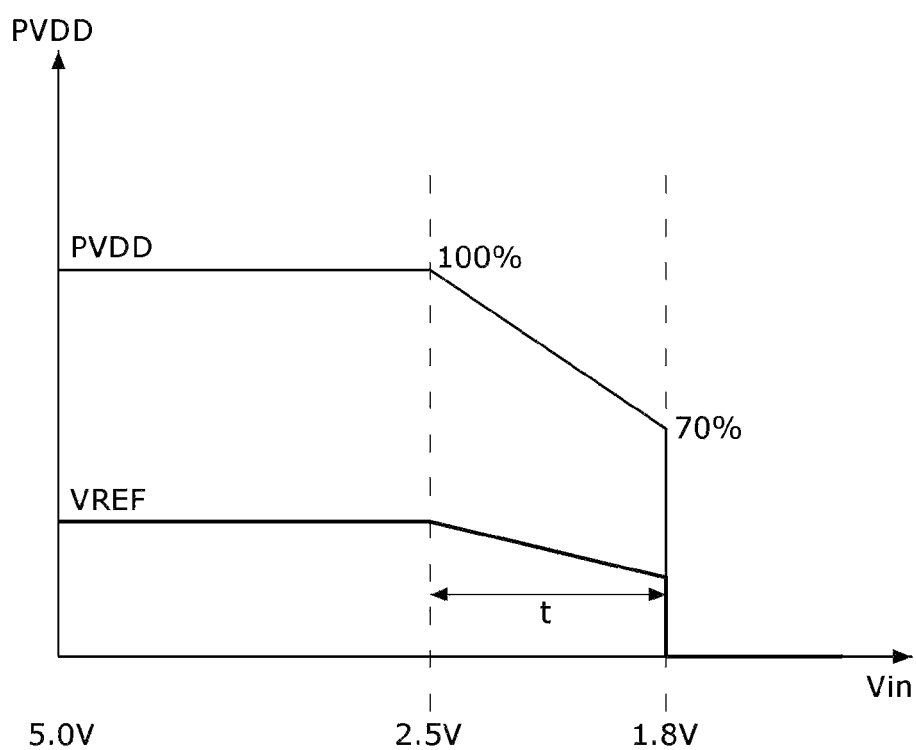
FIGS. 7A to 7D are views for describing the principle of varying a reference voltage according to a fluctuation of an input voltage according to an exemplary embodiment of the present disclosure.

As shown in FIG. 7A, the high-potential power voltage PVDD as well as the reference voltage Vref is lowered during a section t in which the input voltage Vin is lowered from 2.5 V to 1.8 V.

Figure 7B:
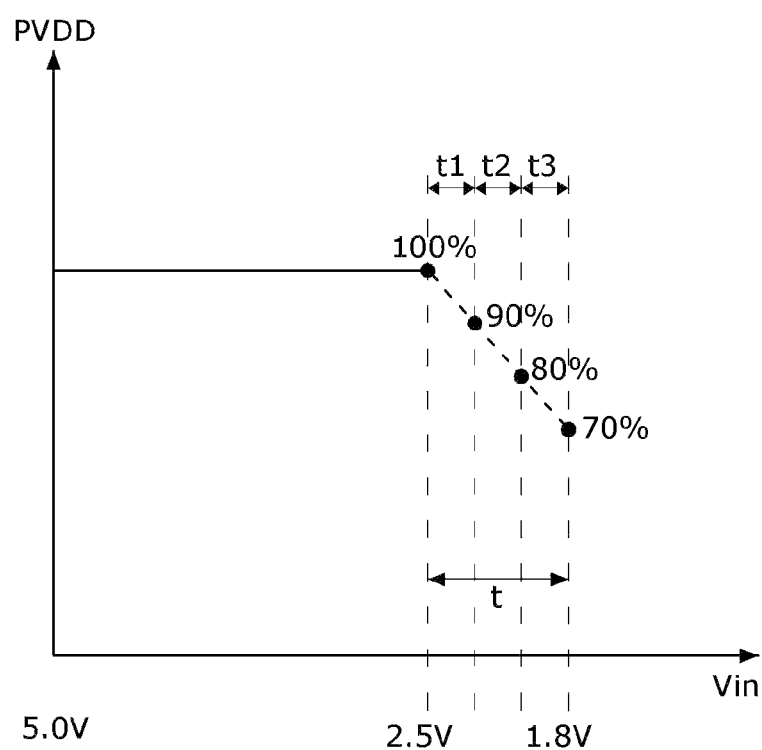
Figure 7C:
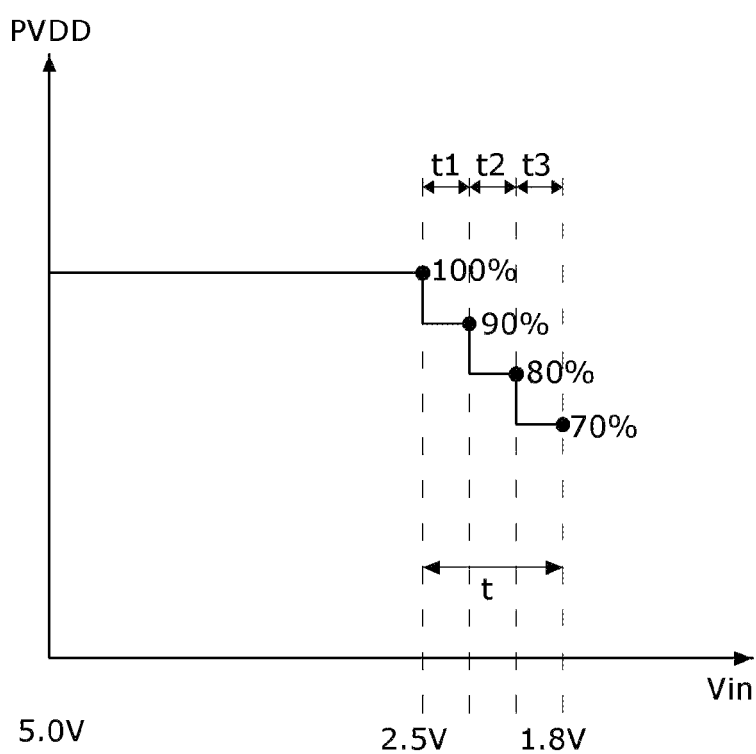
Figure 7D:
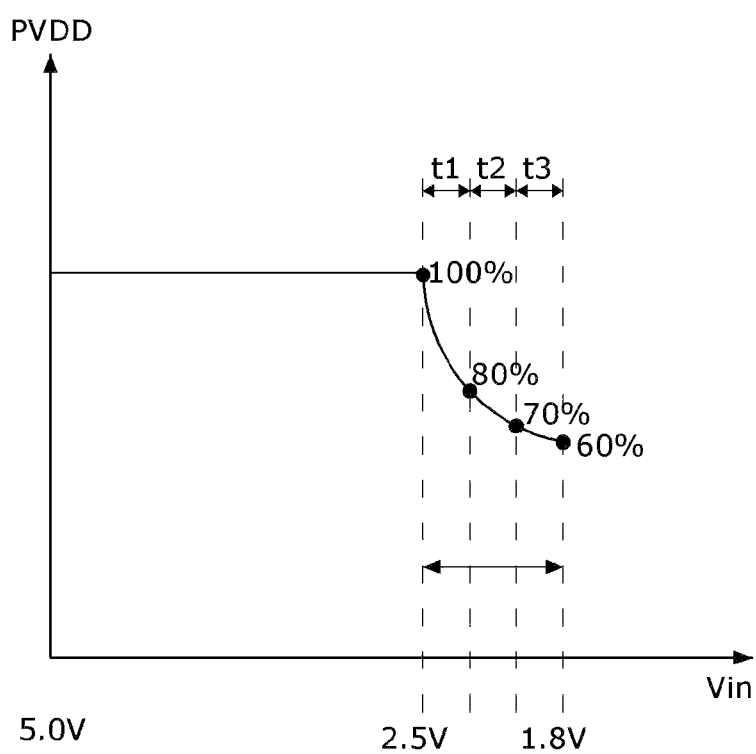

The high-potential power voltage PVDD output from the first power voltage generation circuit 141 may be linearly lowered at a constant rate in each section t1, t2, and t3 according to a change in the input voltage Vin as shown in FIG. 7B, may be gradually lowered at a constant rate in each section t1, t2, and t3 according to the change in the input voltage Vin as shown in FIG. 7C, or may be sharply lowered in a form of an exponential function in each section t1, t2, and t3 according to the change in the input voltage Vin as shown in FIG. 7D.

Here, an example in which the high-potential power voltage is varied in proportion to the input voltage is described, but the present disclosure is not necessarily limited thereto, and the low-potential power voltage may also be varied in various ways. Further, in FIGS. 7A to 7D, only an example in which the high-potential power voltage is varied in the section of the input voltage from 2.5 V to 1.8 V is described, but the section may be changed.

Figure 8:
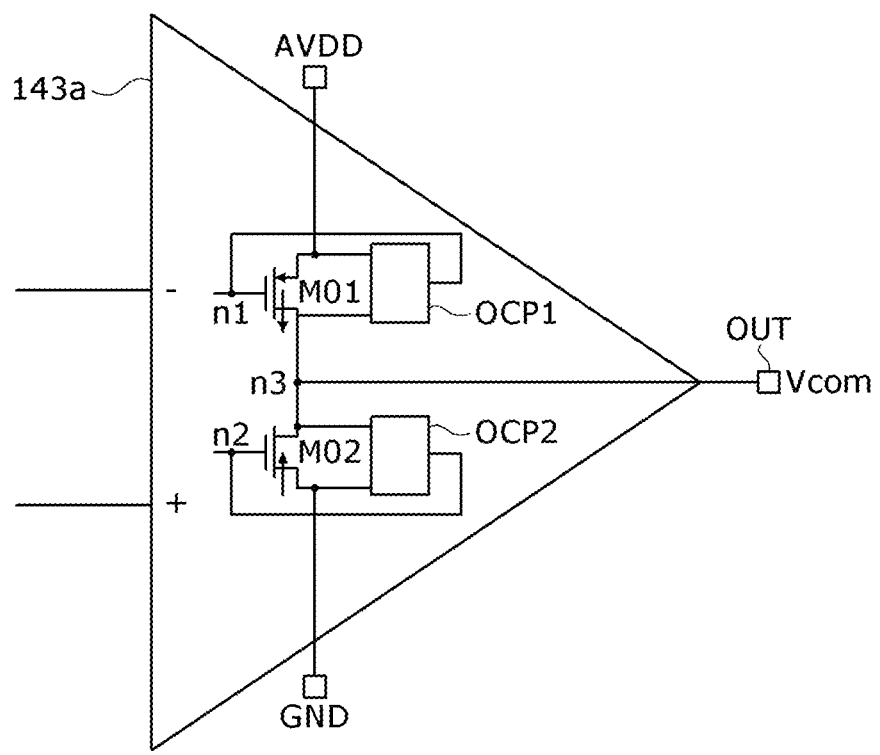
FIG. 8 is a view illustrating a configuration of a common voltage generation circuit shown in FIG. 4 according to an exemplary embodiment of the present disclosure.
Figure 9A:
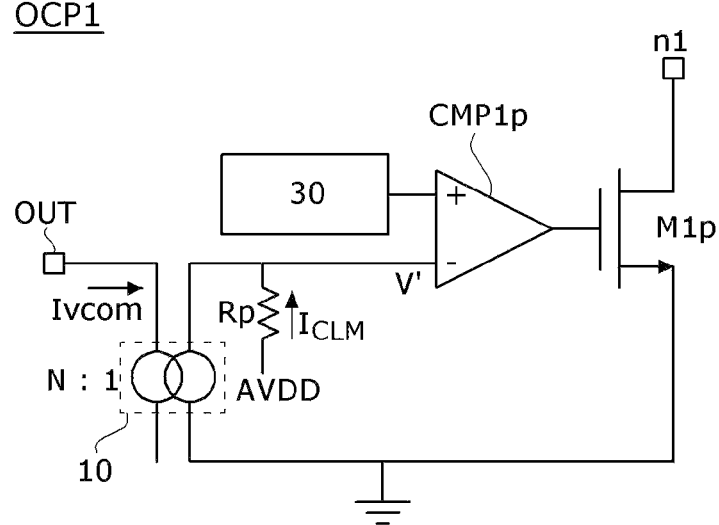
FIGS. 9A and 9B are views illustrating configurations of first and second over current protection (OCP) circuits shown in FIG. 8 according to an exemplary embodiment of the present disclosure.
Figure 9B:
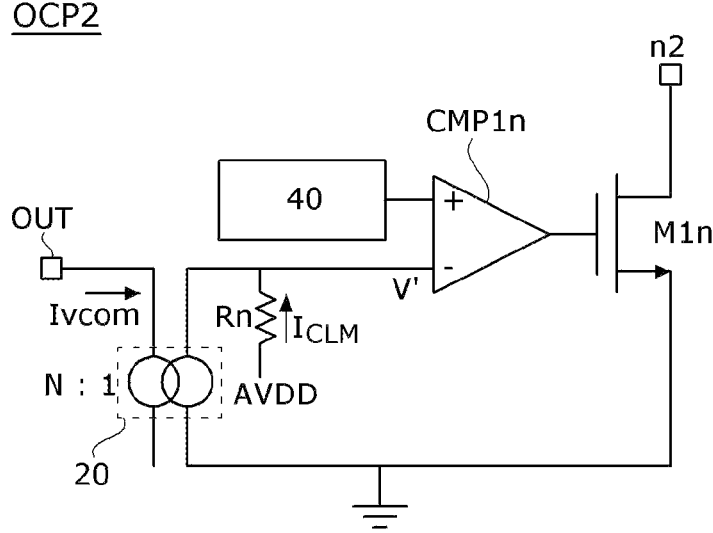
Figure 10A:
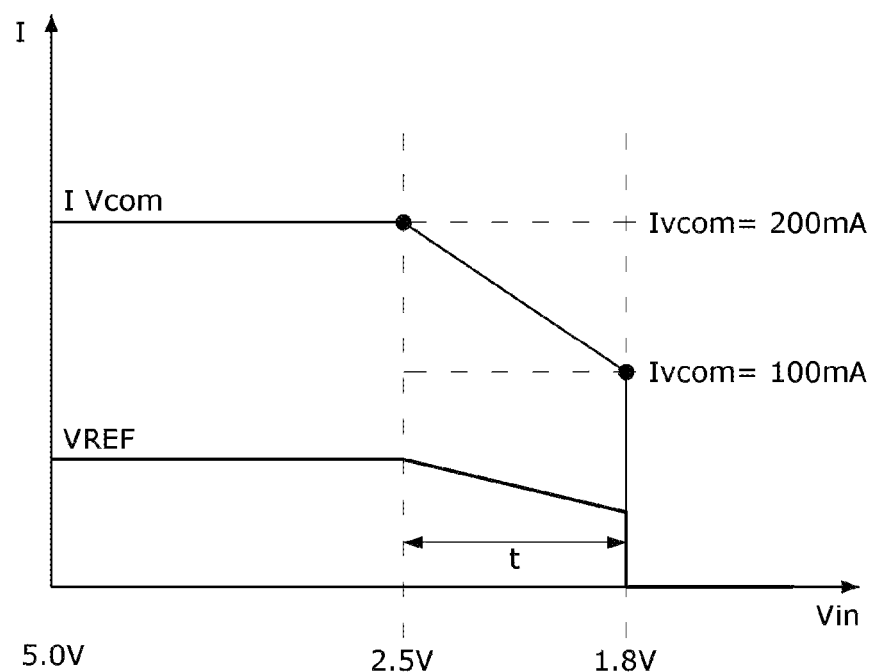
FIGS. 10A and 10B are views for describing the principle of varying an output current according to the fluctuation of the input voltage according to an exemplary embodiment of the present disclosure.
Figure 10B:
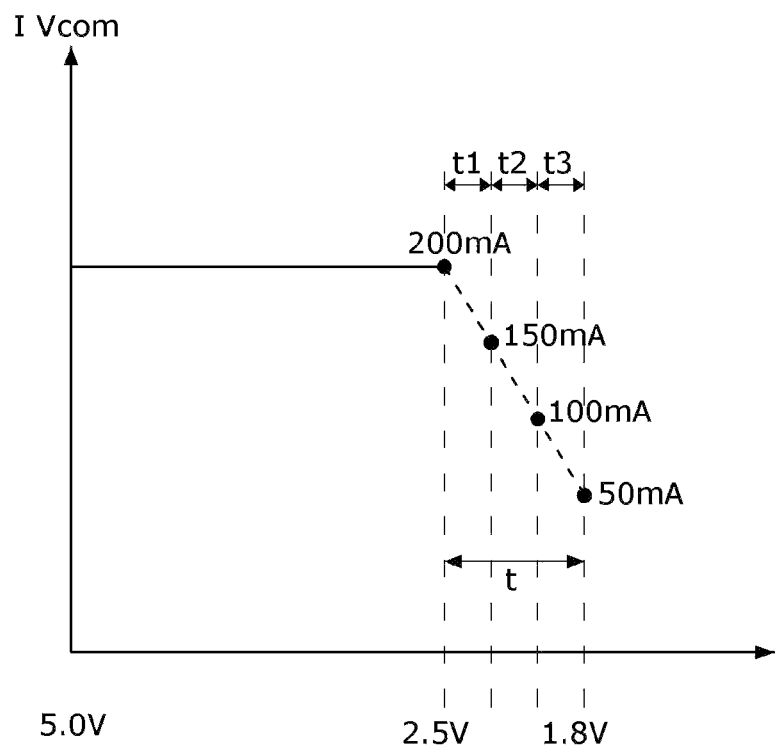

FIG. 8 is a view illustrating a configuration of a common voltage generation circuit shown in FIG. 4 according to an exemplary embodiment of the present disclosure, FIGS. 9A and 9B are views illustrating configurations of first and second over current protection (OCP) circuits shown in FIG. 8 according to an exemplary embodiment of the present disclosure, and FIGS. 10A and 10B are views for describing the principle of varying an output current according to the fluctuation of the input voltage according to an exemplary embodiment of the present disclosure.

Referring to FIG. 8, the common voltage generation circuit 143 according to the exemplary embodiment of the present disclosure may include a common voltage amplification circuit 143a, and the common voltage amplification circuit 143a may amplify a common voltage Vcom based on a first power voltage AVDD and a second power voltage GND, and output the common voltage Vcom.

In this case, the common voltage amplification circuit 143a may include a first switch element M01, a second switch element M02, a first over current protection (OCP) circuit OCP1, and a second OCP circuit OCP2.

The first switch element M01 may be turned on by a high voltage of a first node n1, to output the first power voltage AVDD to the third node n3 which is an output node. The first switch element M01 may be implemented as a high-side field effect transistor (a p-channel metal-oxide-semiconductor (PMOS)).

The second switch element M02 may be turned on by a high voltage of a second node n2 to discharge the third node n3 which is the output node. The second switch element M02 may be implemented as a low-side field effect transistor (an n-channel metal-oxide-semiconductor (NMOS)).

The first OCP circuit OCP1 turns off the first switch element M01 by discharging the first node n1 up to the second power voltage GND when a current flowing through the first switch element M01 is greater than or equal to a selected (or in some embodiments, predetermined) threshold value.

The first OCP circuit OCP1 may limit the current flowing through the first switch element M01.

Referring to FIG. 9A, the first OCP circuit OCP1 may include a first p current mirror 10, a reference voltage generation circuit 30, a first p resistor Rp, a first p comparator circuit CMP1p, and a first p switch element M1p.

The first p current mirror 10 may reduce an output current Ivcom output to the third node n3 by N:1 and output the output current Ivcom to an inverting terminal (−) of the first p comparator circuit CMP1p.

The reference voltage generation circuit 30 may generate a reference voltage Vref. The reference voltage generation circuit 30 is the same as FIG. 6A or 6B.

The first p resistor Rp is connected between the inverting terminal (−) and a line to which the first power voltage AVDD is applied.

The first p comparator circuit CMP1p may compare the reference voltage Vref input to a non-inverting terminal (+) and a voltage V' input to the inverting terminal (−) and output a result value. In this case, the voltage V' may be acquired by the following formula V'=AVDD−($I_{CLM}$/N*Rp).

In this case, the first p comparator circuit CMP1p outputs a result value '1' when the reference voltage Vref is greater than the voltage V', and outputs a result value '0' when the reference voltage Vref is smaller than the voltage V'.

The first p switch element M1p is turned on to limit the output current by discharging the voltage of the first node n1 when the result value output from the first p comparator circuit CMP1p is '1.'

The first p switch element M1p is turned off when the result value output from the first p comparator circuit CMP1p is '0.'

The second OCP circuit OCP2 turns off the second switch element M02 by discharging the second node n2 when a current flowing through the second switch element M02 is greater than or equal to the selected (or in some embodiments, predetermined) threshold value.

Referring to FIG. 9B, the second OCP circuit OCP2 may include a first n current mirror 20, a first n comparator circuit CMP1n, a reference voltage generation circuit 40, a first n resistor Rn, and a first n switch element M1n.

The first n current mirror 20 may reduce the output current Ivcom output to the third node n3 by N:1 and output the output current Ivcom to an inverting terminal (−) of the first n comparator circuit CMP1n.

The reference voltage generation circuit 40 may generate a reference voltage Vref. The reference voltage generation circuit 40 is the same as FIG. 6A or 6B.

The first n resistor Rn is connected between the inverting terminal (−) and a line to which the first power voltage AVDD is applied.

The first n comparator circuit CMP1n may compare the reference voltage Vref input to a non-inverting terminal (+) and a voltage V' input to the inverting terminal (−) and output a result value. In this case, the voltage V' may be acquired by the following formula V'=AVDD−($I_{CLM}$/N*Rn).

The first n switch element M1n is turned on to limit the output current by discharging the voltage of the second node n2 when the result value output from the first n comparator circuit CMP1n is '1.'

The first n switch element M1n is turned off when the result value output from the first n comparator circuit CMP1n is '0.'

As shown in FIG. 10A, a case where the OCP circuit limits the current up to 100 mA in proportion to the input current is shown. That is, when the input voltage Vin is 1.8 V, the output current Ivcom is lowered up to 100 mA. As shown in FIG. 10B, the output current Ivcom output through the common voltage generation circuit 143 may be linearly lowered at a constant rate in proportion to the input voltage Vin, but is not limited thereto, and may be gradually lowered at a constant rate in proportion to the input voltage Vin or may be lowered in a form of an exponential function in proportion to the input voltage Vin.

In the above-described embodiment, an example in which an output voltage of the power voltage generation circuit and an output current of the common voltage generation circuit are varied according to a fluctuation of the input voltage and output is described, but the present disclosure is not limited thereto, and it is also possible to vary and output various output voltages such as a gamma reference voltage and output currents in proportion to the fluctuation of the input voltage.

FIGS. 11A to 14B are views illustrating simulation results according to the exemplary embodiment.

Figure 11A:
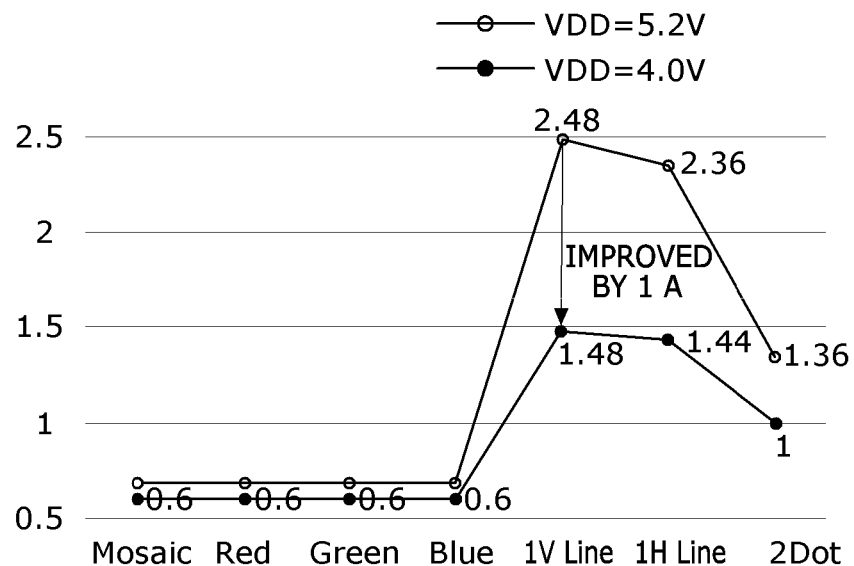
FIGS. 11A to 14B are views illustrating simulation results according to the exemplary embodiment.

Referring to FIG. 11A, a change in the input current according to a load pattern is shown, and it can be seen that the input current decreases when the output voltage decreases. Specifically, since the input current decreases in a specific pattern in which a load is large, power consumption may be reduced.

Figure 11B:
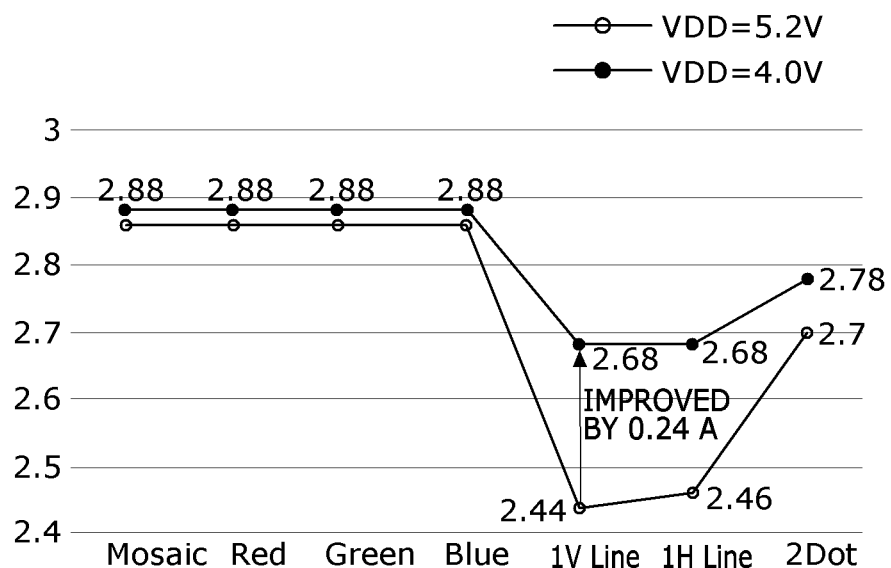

Referring to FIG. 11B, a change in the input voltage according to the load pattern is shown, and it can be seen that the input voltage decreases when the output voltage decreases. Specifically, since the input voltage decreases in the specific pattern in which the load is large, power consumption may be reduced.

Accordingly, in the embodiment, when the input voltage fluctuates in the specific pattern in which the load is large, the output voltage or output current is varied to correspond to the fluctuation amount.

Figure 12A:
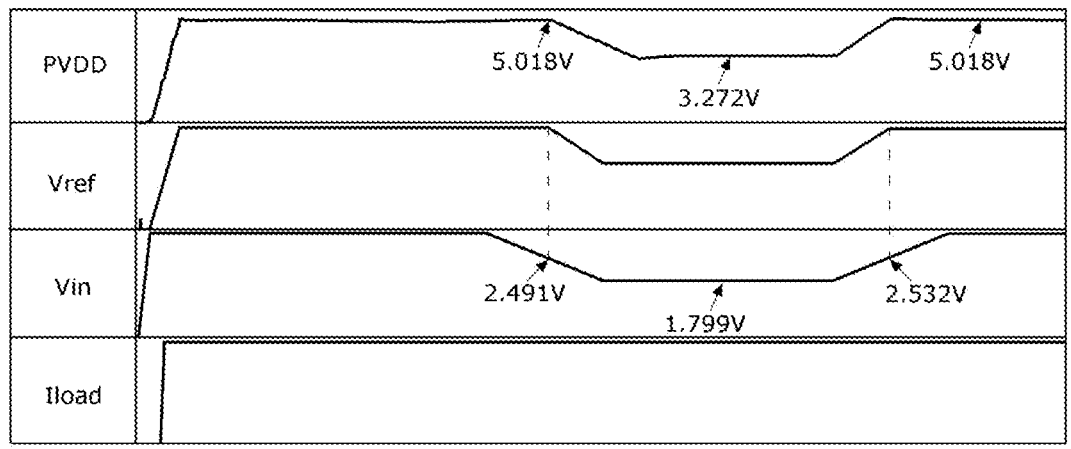
Figure 12B:
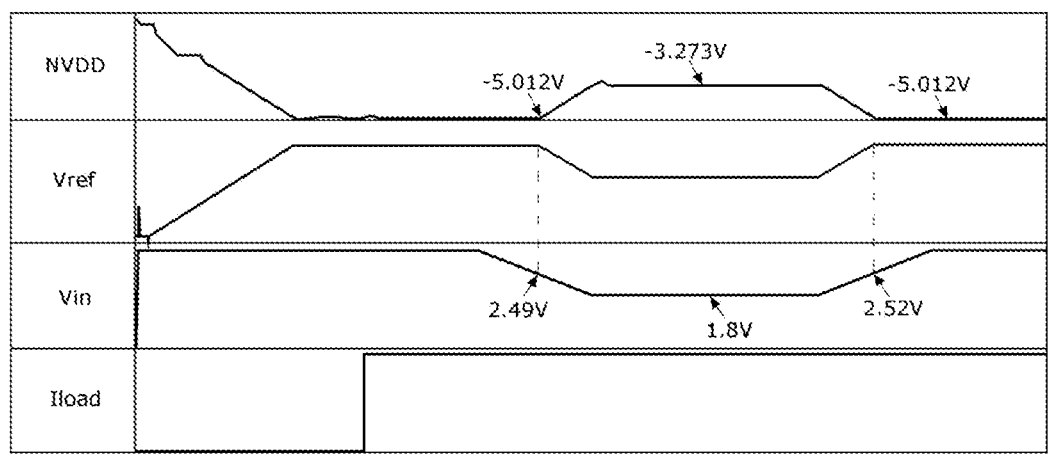

FIGS. 12A and 12B illustrate simulation results in which the high-potential power voltage PVDD and the low-potential power voltage NVDD are adjusted in proportion to the input voltage Vin.

Referring to FIG. 12A, according to the exemplary embodiment, it shows that the high-potential power voltage PVDD varies in proportion to the input voltage Vin. Here, when the input voltage Vin fluctuates, the reference voltage Vref and the high-potential power voltage PVDD are varied in proportion to the fluctuation amount.

Referring to FIG. 12B, according to the exemplary embodiment, it shows that the low-potential power voltage NVDD varies in proportion to the input voltage Vin. Here, when the input voltage Vin fluctuates, the reference voltage Vref and the low-potential power voltage NVDD are varied in proportion to the fluctuation amount.

Figure 13A:
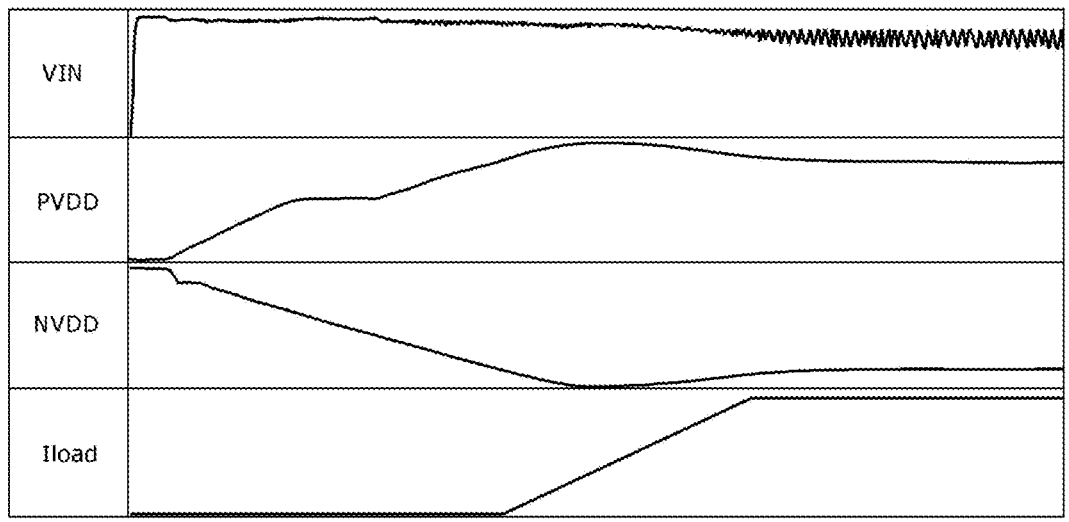
Figure 13B:
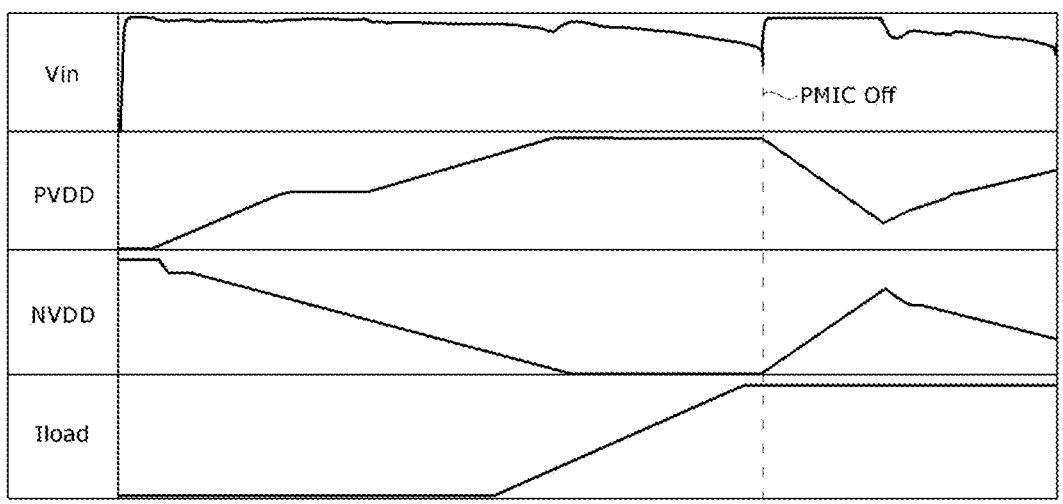

FIGS. 13A and 13B illustrate simulation results between an exemplary embodiment in which the output voltage is adjusted in proportion to the input voltage Vin and a comparative example in which the output voltage is not adjusted.

Referring to FIG. 13A, according to the exemplary embodiment, as shown in FIGS. 12A and 12B, it shows that the high-potential power voltage PVDD and the low-potential power voltage NVDD vary in proportion to the input voltage Vin.

Referring to FIG. 13B, in the comparative example, it shows that power is turned off by the operation of an under voltage lock out (UVLO) of the power supply as the input voltage Vin fluctuates.

Figure 14A:
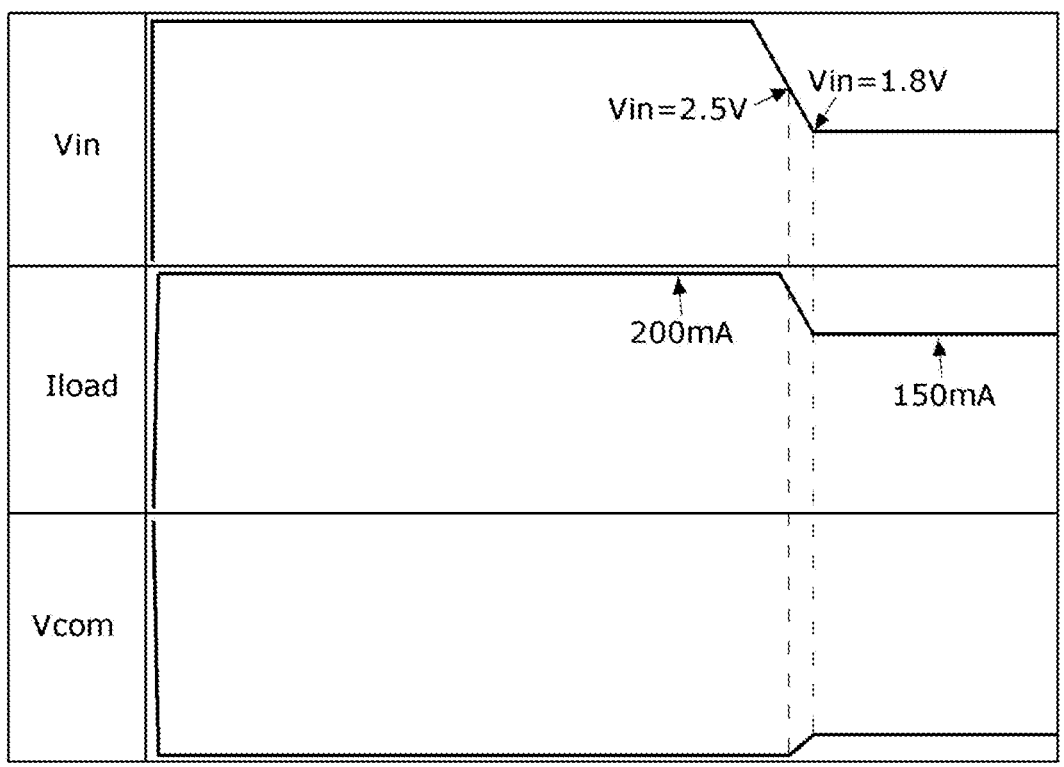
Figure 14B:
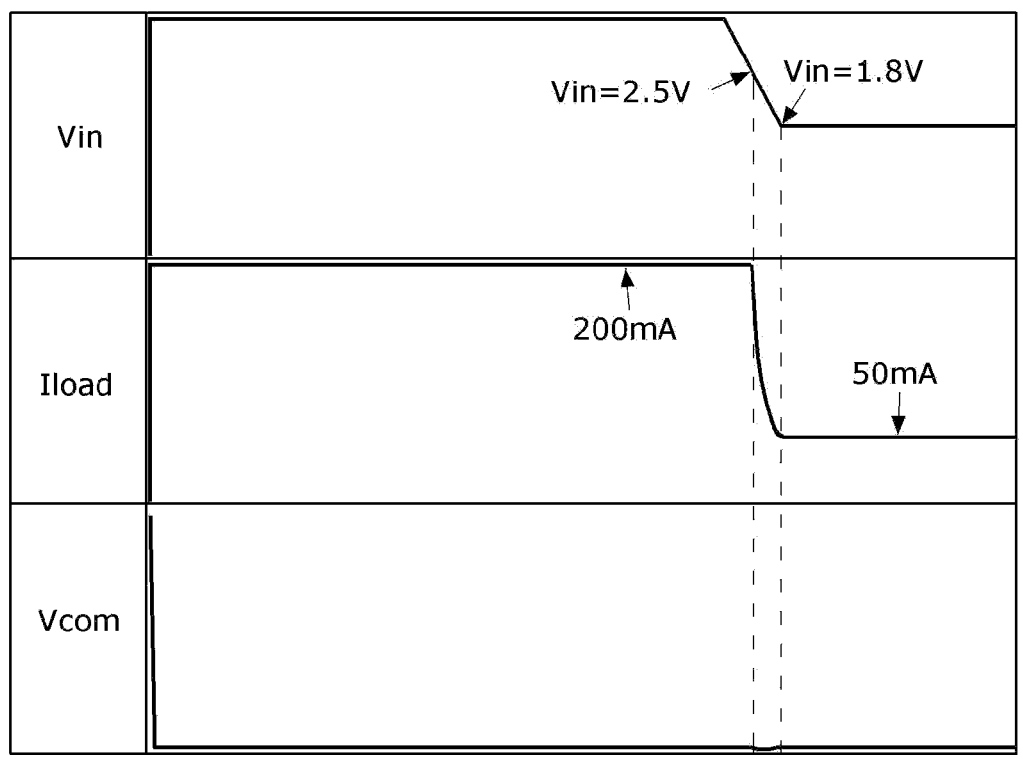

FIGS. 14A and 14B illustrate simulation results in which the output current output through the common voltage generation circuit is adjusted in proportion to the input voltage Vin according to an exemplary embodiment of the present disclosure.

Referring to FIG. 14A, according to the exemplary embodiment, it shows that an output current of 200 mA output through the common voltage generation circuit varies with limitation in proportion to the input voltage Vin.

Referring to FIG. 14B, according to the exemplary embodiment, it shows that an output current of 50 mA output through the common voltage generation circuit varies with limitation in proportion to the input voltage Vin.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A power supply comprising:
a reference voltage generation circuit configured to adjust a voltage level of a reference voltage and output the adjusted reference voltage, when an input voltage which varies according to a pattern of an input image displayed on a display panel is smaller than or equal to a selected threshold value; and
a power voltage generation circuit configured to adjust and provide an output power applied commonly to all sub-pixels according to a fluctuation amount of the input voltage based on the adjusted reference voltage.

2. The power supply of claim 1, wherein the reference voltage generation circuit includes:

a comparator circuit configured to compare the input voltage and the threshold value and output a comparison value;

a first amplifier configured to amplify and output a first band gap reference voltage;

a second amplifier configured to amplify and output the input voltage;

a first switch connected between an output end of the first amplifier and an output terminal of the reference voltage generation circuit, and turned on or turned off according to the comparison value;

a second switch connected between an output end of the second amplifier and the output terminal, and turned off or turned on according to the comparison value; and a third resistor connected between the output terminal and ground.

3. The power supply of claim 2, wherein the second switch is turned on or turned off according to an inverted value of the comparison value.

4. The power supply of claim 2, wherein when the input voltage is greater than the threshold value, the first switch is turned on, and the second switch is turned off, and when the input voltage is smaller than the threshold value, the first switch is turned off, and the second switch is turned on.

5. The power supply of claim 3, wherein the reference voltage generation circuit further includes:

a third amplifier configured to amplify and output a second band gap reference voltage; and a third switch connected between an output end of the third amplifier and the output terminal, and turned on or turned off according to the inverted value of the comparison value.

6. The power supply of claim 5, wherein when the input voltage is greater than the threshold value, the first switch is turned on, and the second switch and the third switch are turned off, and when the input voltage is smaller than the threshold value, the first switch is turned off, and the second switch and the third switch are turned on.

7. The power supply of claim 1, wherein the power voltage generation circuit includes:

a converter configured to generate the output voltage based on the input voltage and a control signal and output the output voltage through an output terminal of the power voltage generation circuit;

a voltage sensing circuit configured to divide the output voltage and transmit the divided voltage; and wherein the power voltage variable circuit is configured to apply the control signal for adjusting the output voltage to the converter, based on the divided voltage and the adjusted reference voltage.

8. The power supply of claim 7, wherein the voltage sensing circuit includes a first resistor and a second resistor connected in series between the output terminal and ground.

9. The power supply of claim 7, wherein the power voltage variable circuit includes:

an operational amplifier including a first input end to which the adjusted reference voltage is input, a second input end to which the divided voltage is input, and an output end configured to output a control voltage; and a pulse width modulation logic configured to output the control signal according to the control voltage.

10. The power supply of claim 1, further comprising a common voltage generation circuit, wherein the common voltage generation circuit includes:

a first switch element turned on by a high voltage of a first node to which a gate electrode of the first switch element is connected to output a first power voltage to an output node;

a second switch element turned on by a high voltage of a second node to which a gate electrode of the second switch element is connected to discharge the output node;

a first over current protection circuit connected to the first switch element, and configured to discharge the first node when a current flowing through the first switch element is greater than or equal to a threshold value; and a second over current protection circuit connected to the second switch element, and configured to discharge the second node when a current flowing through the second switch element is greater than or equal to a threshold value.

11. The power supply of claim 1, wherein the power voltage generation circuit includes:

a first switch element turned on by a high voltage of a first node to which a gate electrode of the first switch element is connected to output a first power voltage to an output node;

a second switch element turned on by a high voltage of a second node to which a gate electrode of the second switch element is connected to discharge the output node;

a first over current protection circuit connected to the first switch element, and configured to discharge the first node when a current flowing through the first switch element is greater than or equal to a threshold value; and a second over current protection circuit connected to the second switch element, and configured to discharge the second node when a current flowing through the second switch element is greater than or equal to a threshold value.

12. The power supply of claim 11, wherein:

the first switch element is implemented as a high-side field effect transistor; and the second switch element is implemented as a low-side field effect transistor.

13. The power supply of claim 11, wherein the first over current protection circuit includes:

a comparator circuit configured to compare a reference voltage input to a non-inverting terminal and a voltage input to an inverting terminal and output a result value;

a current mirror configured to reduce an output current flowing through an output terminal of the power voltage generation circuit and output the output current to the inverting terminal;

a resistor connected between the inverting terminal and a line to which the first power voltage is applied; and a third switch element connected between the first node and ground, and turned on or turned off according to the result value output from the comparator circuit.

14. The power supply of claim 13, wherein the third switch element is turned on to discharge the first node when the voltage input to the inverting terminal of the comparator circuit is greater than the reference voltage input to the non-inverting terminal.

15. The power supply of claim 13, wherein the reference voltage is output from the reference voltage generation circuit.

16. The power supply of claim 11, wherein the second over current protection circuit includes:

a comparator circuit configured to compare a reference voltage input to a non-inverting terminal and a voltage input to an inverting terminal and output a result value;

a current mirror configured to reduce an output current flowing through a output terminal of the power voltage generation circuit and output the output current to the inverting terminal;

a resistor connected between the inverting terminal and a line to which the first power voltage is applied; and a third switch element connected between the second node and ground, and turned on or turned off according to the result value output from the comparator circuit.

17. The power supply of claim 16, wherein the third switch element is turned on to discharge the second node when the voltage input to the inverting terminal of the comparator circuit is greater than the reference voltage input to the non-inverting terminal.

18. The power supply of claim 1, wherein the output power is varied by changing the output voltage or the output current.

19. A display device comprising:
a display panel on which a plurality of sub-pixels are disposed;
a display panel driving circuit configured to write pixel data to the sub-pixels of the display panel; and
a power supply to supply power to the display panel and the display panel driving circuit, the power supply including:
  a reference voltage generation circuit configured to adjust a voltage level of a reference voltage and output the adjusted reference voltage, when an input voltage which varies according to a pattern of an input image displayed on the display panel is smaller than or equal to a selected threshold value; and
  a power voltage generation circuit configured to adjust and provide an output power applied commonly to all sub-pixels according to a fluctuation amount of the input voltage based on the adjusted reference voltage.

20. The display device of claim 19, wherein the power supply is configured to generate at least one of a high-potential power voltage, a low-potential power voltage, and a common voltage for driving the plurality of sub-pixels.

* * * * *